United States Patent
Miyagawa

(10) Patent No.: US 6,970,638 B1
(45) Date of Patent: Nov. 29, 2005

(54) RECORDING MEDIUM REPRODUCING APPARATUS

(75) Inventor: Tamotsu Miyagawa, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1042 days.

(21) Appl. No.: 09/598,290

(22) Filed: Jun. 21, 2000

(30) Foreign Application Priority Data

Jun. 22, 1999 (JP) .............................. 11-176135

(51) Int. Cl.$^7$ ............................................. H04N 5/91
(52) U.S. Cl. ....................... 386/46; 386/104; 386/125; 369/52.1
(58) Field of Search ........................ 386/46, 104–106, 386/125, 126, 95; 369/44.29, 32.01, 53.37, 369/275.3, 52.1, 53.2, 53.22; 360/31

(56) References Cited

U.S. PATENT DOCUMENTS 5,809,007 A * 9/1998 Takemura et al. ....... 369/275.3
5,867,463 A * 2/1999 Chiba ..................... 369/44.29
5,963,704 A * 10/1999 Mimura et al. ............... 386/95
6,307,820 B2 * 10/2001 Takeya et al. ........... 369/44.29
6,577,812 B1 * 6/2003 Kikuchi et al. ............. 386/105
6,665,489 B2 * 12/2003 Collart ....................... 386/125

FOREIGN PATENT DOCUMENTS

JP          6-243572          9/1994

* cited by examiner

Primary Examiner—James J. Groody
Assistant Examiner—Christopher Onuaku
(74) Attorney, Agent, or Firm—Morgan, Lewis & Bockius LLP

(57) ABSTRACT

Predetermined information, for example, BCA data and a total reproduction time etc. is read from a loaded disc and the disc information thus read is supplied to a CPU 1. Then, a discrete setting area 3b is retrieved to determine whether or not parameters are registered in correspondence with the disc information thus read. When it is determined that the parameters are registered, the parameters registered in correspondence with the disc information is read from the discrete setting area 3b and set in an audio decoder 12 and a subpicture decoder 13, respectively. When it is determined that the parameters are not registered, standard parameters are read from a standard setting area 3a and set to the audio decoder 12 and the subpicture decoder 13, respectively.

10 Claims, 5 Drawing Sheets

RECORDING MEDIUM REPRODUCING APPARATUS

BACKGROUND OF THE INVENTION

The present invention relates to a recording medium reproducing apparatus for reproducing a recording medium in which video and audio data is recorded and, more particularly, relates to a recording medium reproducing apparatus capable of selecting and reproducing dubbed audio and subpicture (subtitles or caption).

The recording medium reproducing apparatus proposed in Japanese Patent Publication No. 6-243572A is an apparatus which reproduces a recording medium such as a compact disc (CD), a mini disc (MD) etc. and includes a sound field correcting function for improving sound quality and sound field effect. The recording medium reproducing apparatus is arranged in a manner that the sound field setting information is registered in advance for each recording medium on the basis of the discrimination information of the recording medium thereby to reduce the burden of the operation for setting the sound filed of the sound field correction function which has been performed whenever the recording medium is reproduced.

A digital versatile disc (DVD) is a disc-shaped recording medium for recording digital data such as video, audio data etc.

According to the DVD standard, eight kinds of languages as the dubbed audio and thirty two kinds of languages as the subtitles can be recorded on a single disc at the maximum, and the language of the dubbed audio and the language of the subtitles can be freely combined from all the kinds of the languages of the dubbed audio and the subtitles at the time of reproducing a content recorded in the disc.

Thus, a viewer can freely set the dubbed audio and the subtitles to be reproduced in accordance with the viewer's preference and views the content. Such a function is called as a multi-language function.

As the DVD software in which video and audio data is recorded in advance, there is one for sales and another employing the pay-per-view system in which fee is charged each time viewing the content.

In the disc employing the pay-per-view system, it is necessary to manage the contents recorded in the disc. However, in the normal standard of the DVD, unlike the CD standard and the MD standard, it is not obliged to record management information, so that it is difficult to manage the contents in this state.

Thus, in the Divx (digital video express) pay-per-view system designed in the U.S., for example, BCA (burst cutting area) data as the optional standard of DVD is recorded in the burst cutting area. To be more concrete, the BCA data as the management information of the contents is recorded in an area at the inner peripheral side of the data recording area of a disc thereby to provide a system for facilitating the management of the contents recorded in the disc.

The content recorded in a disc accorded to the Divx system is encrypted by the unique encryption system different from other discs and hence can be viewed normally only by a DVD player dedicated to the Divx system.

The BCA data recorded in the BCA is read by the DVD player dedicated to the Divx system on a viewer side, then transmitted to a content management center by way of a telephone line and used for discriminating the content in the content management center. In the content management center, fee for each viewer is accounted in accordance with the contents and the viewing number of the contents.

The DVD player is arranged so as to be able to store only one set of the dubbed audio and the subtitles by using the aforesaid multi-language function and to continuously use this setting state.

To be more concrete, the DVD player is arranged so as to be able to store the parameters of the dubbed audio and the subtitles once set in a predetermine memory and to automatically read the parameters thus stored from the memory and set the dubbed audio and the subtitles thus read upon reproducing the content at the next time.

However, according to the related DVD player, the same dubbed audio and the subtitles is set on the basis of the parameters stored in the memory irrespective of the exchange of a disc (content) until the setting parameters are changed.

For example, after reproducing a disc having a content of a foreign movie with English voice and Japanese subtitles, when viewing a disc having another content of a documentary movie with Japanese voice without subtitles, such another content is reproduced with English voice and Japanese subtitles so long as the parameters are not newly set in accordance with the another content.

Accordingly, since it is required to newly set the parameters in accordance with a newly set content each time the content is exchanged, it has been desired to decrease the burden of such a parameter newly setting operation.

SUMMARY OF THE INVENTION

Accordingly, the present invention has been made in view of the aforesaid problem of the prior art, and an object of the present invention is to provide a recording medium reproducing apparatus which can reduce the burden of setting operation of the parameters of dubbed audio and subtitles for each content.

In order to achieve the above object, according to the present invention, there is provided a reproducing apparatus for an recording medium including a content to be reproduced and a plurality of selectable data contents which are related to an identical reproduction time of the reproduced content, which comprises:
 a memory for storing a plurality of setting parameters respectively associated with predetermined kinds of data contents;
 a discriminator for discriminating the data contents stored in the recording medium;
 a parameter selector for selecting at least one of the setting parameters stored in the memory and associated with the discriminated data contents; and
 a content selector for selecting at least one of the data contents stored in the recording medium based on the selected setting parameter.

Preferably, the discriminator discriminates the data contents stored in the recording medium based on discrimination information recorded on the recording medium.

Preferably, the discrimination information is BCA data.

Preferably, the discriminator discriminates the data contents stored in the recording medium by analyzing setting data recorded in the recording medium.

Preferably, the setting data is data indicating a total reproduction time of stored data.

Preferably, the setting data is data indicating a total number of chapter of stored data.

Preferably, the parameter selector automatically selects a predetermined setting parameter when no parameter setting associated with the discriminated data contents is stored in the memory.

Preferably, the data contents stored in the recording medium include plural kinds of dubbed audio data and subtitles data of the reproduced content. The content selector includes an audio decoder for decoding one of the dubbed audio data and a subpicture decoder for decoding one of the subtitles data in accordance with the selected setting parameter, respectively.

According to the present invention, there is also provided a method of reproducing a content stored in a recording medium together with a plurality of selectable data contents which are related to an identical reproduction time of the reproduced content, which comprises the steps of:

storing a plurality of setting parameters respectively associated with predetermined data contents in a memory;

discriminating the data contents stored in the recording medium;

judging whether a setting parameter associated with the discriminated data contents is stored in the memory;

selecting the associated setting parameter when it is stored in the memory;

selecting at least one of the data contents stored in the recording medium based on the selected setting parameter; and reproducing the contents together with the selected data contents.

Preferably, the reproducing method further comprises the step of selecting one predetermined setting parameter when no setting parameter associated with the discriminated data contents is stored in the memory in advance.

DETAILED DESCRIPTION OF THE PREFERRED EMBODIMENTS

Figure 1:
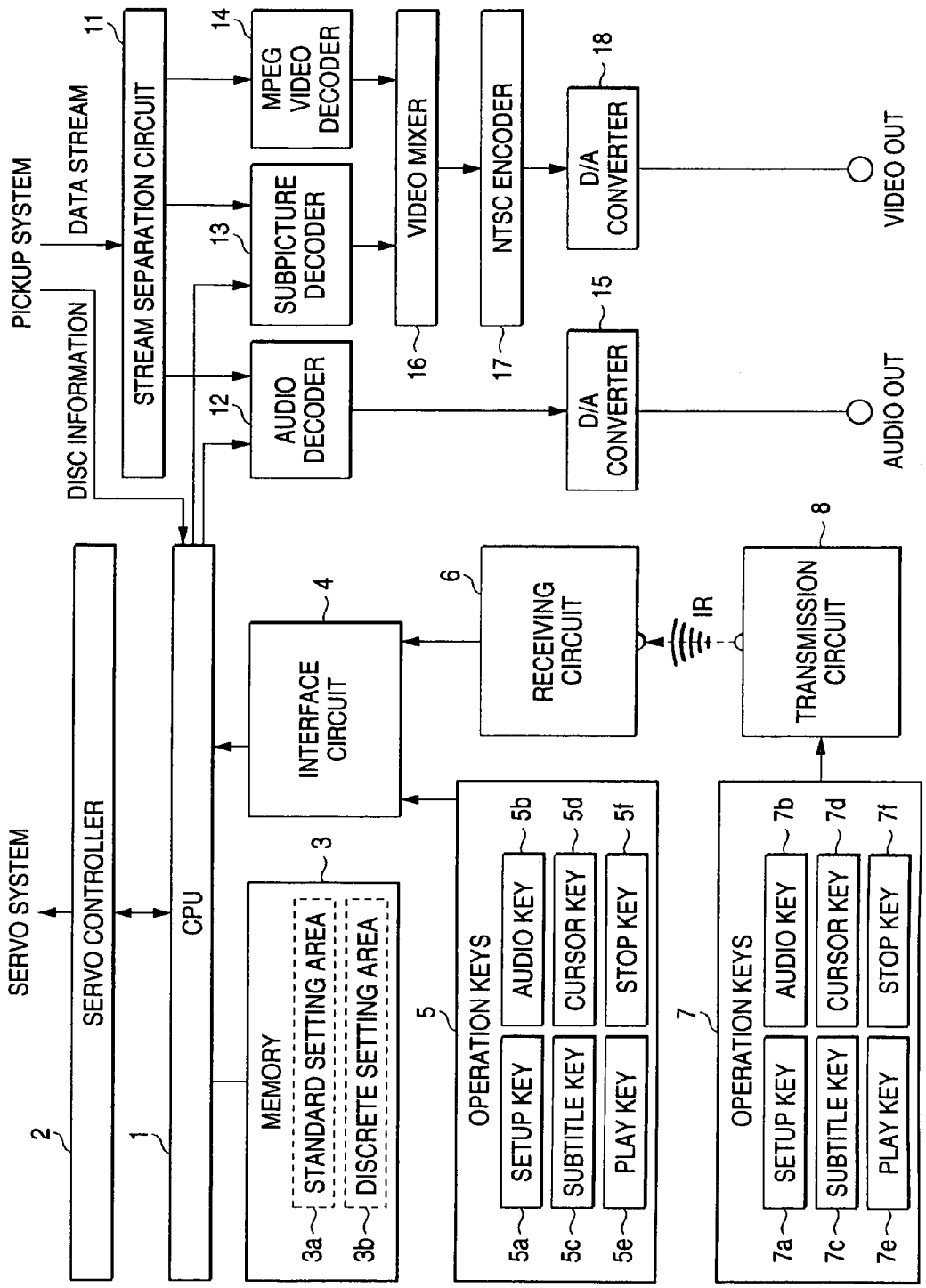
FIG. 1 is a block diagram showing the arrangement of a recording medium reproducing apparatus according to the invention.

FIG. 1 is a block diagram showing the arrangement of a recording medium reproducing apparatus according to the invention, and particularly shows the signal processing system of a DVD player. In the figure, a reference numeral 1 denotes a central processing unit (CPU) which is connected to a servo controller 2 for driving and controlling a servo system such as a spindle motor or a feeding motor, to a memory 3 relating to the setting and registration of parameters for designating dubbed audio and subtitles to be reproduced, to an interface circuit 4 relating to the setting operation of parameters, to an audio decoder 12 for setting the parameter of dubbed audio, and to a subpicture decoder 13 for setting the parameter of subtitles. The CPU 1 is arranged to be supplied with information (hereinafter called as disc information), for example BCA data and a total reproduction time etc., to be used for discriminating a disc which is read from a pickup system.

The memory 3 is provided with a standard setting area 3a for storing standard parameters of dubbed audio and subtitles and a discrete setting area 3b for storing a predetermined parameter for each disc (content).

The interface circuit 4 is connected to operation keys 5 and a receiving circuit 6. The interface circuit converts a signal supplied from the operation keys 5 or the receiving circuit 6 into a command supplies to the CPU 1.

The operation keys 5 include a SETUP key 5a, an AUDIO key 5b, a SUBTITLE key 5c, a cursor key 5d, a PLAY key 5e and a STOP key 5f which correspond to the operation for changing into an operation mode for setting the standard parameters, the operation for changing the parameter of dubbed audio, the operation for changing the parameter of subtitles, the operation for starting the reproduction and the operation for stopping the reproduction, respectively.

The receiving circuit 6 receives a signal transmitted by means of an infrared ray IR.

A reference numeral 7 denotes operation keys for a remote controller which include a SETUP key 7a, an AUDIO key 7b, a SUBTITLE key 7c, a cursor key 7d, a PLAY key 7e and a STOP key 7f, like the operation keys 5. The operation keys 7 supply a signal generated by the key operation thereof to a transmission circuit 8. The transmission circuit 8 transmits the signal supplied from the operation keys 7 to the receiving circuit 6 by means of an infrared ray IR.

A reference numeral 11 denotes a stream separation circuit which separates data stream read from a disc by the pickup system into the respective streams of audio, subpicture (subtitles) and MPEG (moving picture experts group) video and supplies the respective streams thus separated to an audio decoder 12, a subpicture (subtitle) decoder 13 and an MPEG decoder 14, respectively.

The audio decoder 12 determines whether or not the data kind of the audio stream corresponding to the parameter set in advance is the linear PCM (pulse code modulation). When it is determined that the data kind is the linear PCM, the audio decoder passes the data as it is, whilst when it is determined that the data kind is not the linear PCM, the data decoder decodes the data and supplies the decoded data to a digital-to-analog (D/A) converter 15. The D/A decoder 15 converts the decoded data into an analog signal and outputs the analog signal.

The subpicture decoder 13 decodes the subpicture (subtitle) stream corresponding to the parameter set in advance and supplies the decoded data to a video mixer 16.

The MPEG decoder 14 decodes the MPEG video stream and supplies the decoded data to the video mixer 16.

The video mixer 16 synthesizes the MPEG video stream thus supplied with the subpicture (subtitles) and supplies a composite video signal thus synthesized to an NTSC encoder 17.

The NTSC encoder 17 converts the composite video signal thus supplied into a television signal, then adds a macro vision signal for copy-protection to the television signal and supplies the television signal thus added with the macro vision signal to a D/A converter 18. The D/A converter 18 converts the television signal thus supplied into an analog signal and outputs the analog signal.

Figure 2:
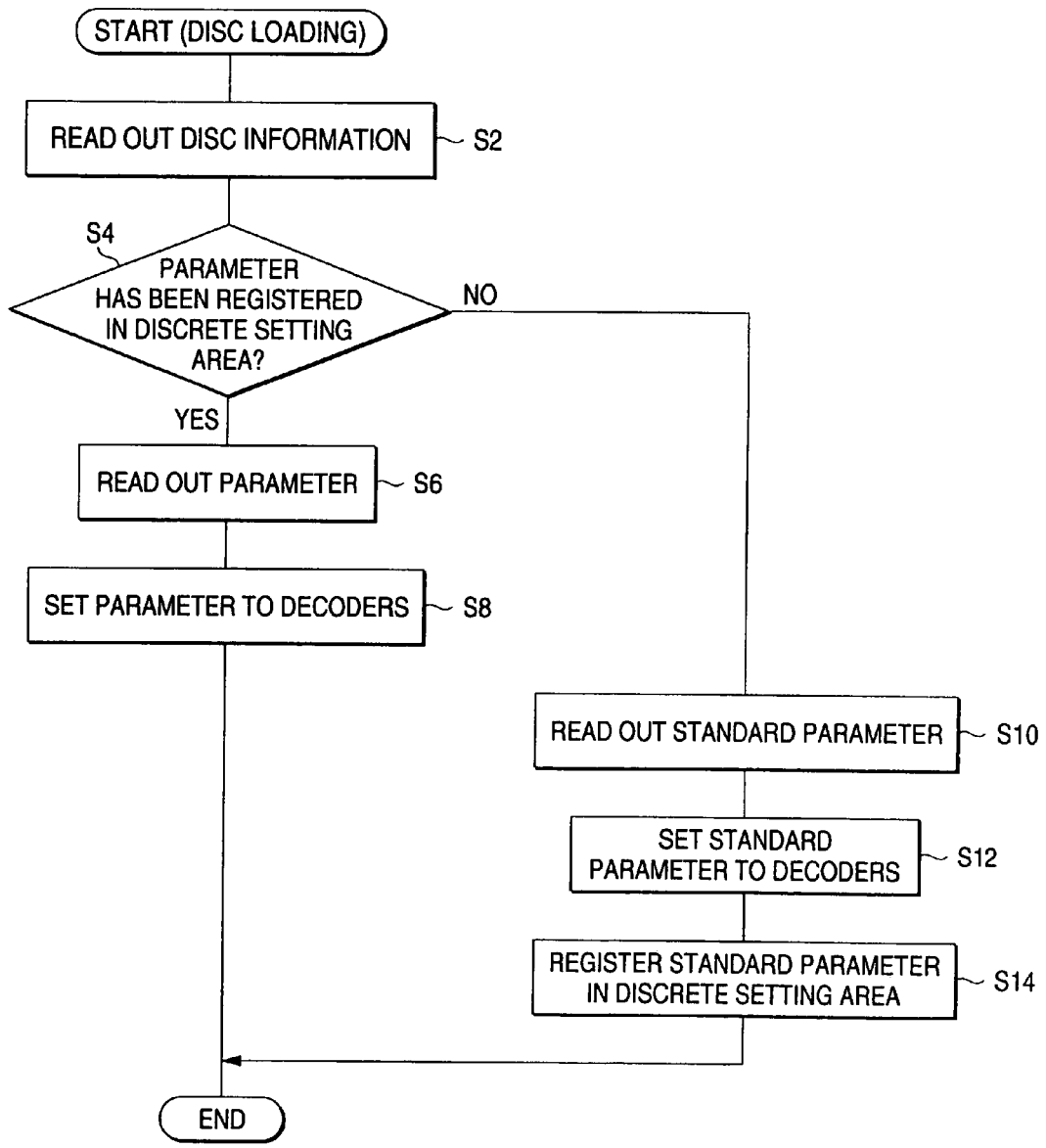
FIG. 2 is a flow chart showing the processing procedure at the time of loading a disc in the recording medium reproducing apparatus according to the invention.

FIG. 2 is a flow chart showing the processing procedure at the time of mounting or loading a disc in the aforesaid recording medium reproducing apparatus. First, predetermined disc information, for example, BCA data and the total reproduction time etc. is read from a loaded disc and the disc information thus read is supplied to the CPU 1 (S2). Then, the discrete setting area 3b is retrieved to determine whether or not the parameters are registered in correspondence with the disc information thus read (S4). When it is determined that the parameters are registered, the parameters registered in correspondence with the disc information is read from the discrete setting area 3b (S6) and set in the audio decoder 12 and the subpicture decoder 13, respectively, (S8). Then, the processing is terminated, that is, the apparatus is placed in a reproduction stand-by state.

In step S4, when it is determined that the corresponding parameters are not registered, the standard parameters are read from the standard setting area 3a (S10) and set to the audio decoder 12 and the subpicture decoder 13, respectively (S12).

Then, the standard parameters are newly registered in the discrete setting area 3b in correspondence with the disc information (S14). Then, the processing is terminated, that is, the apparatus is placed in the reproduction stand-by state.

Figure 3:
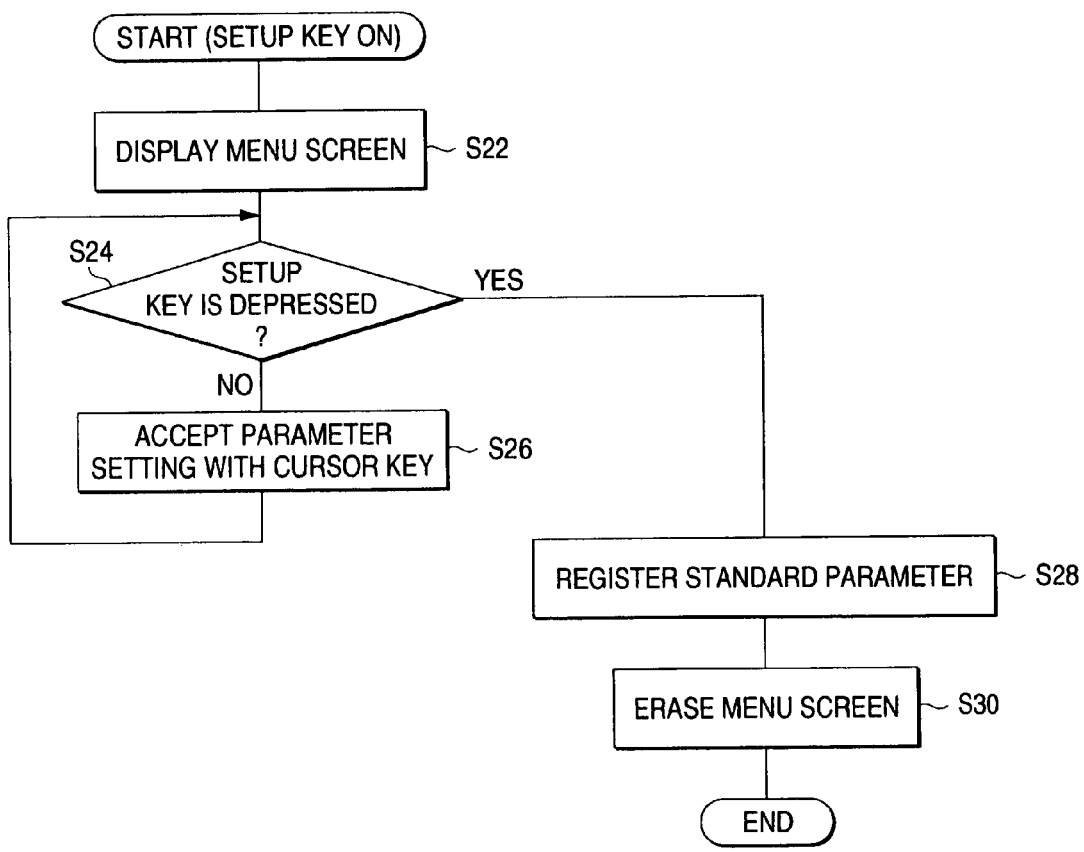
FIG. 3 is a flow chart showing the procedure of processing the standard parameter setting mode in the recording medium reproducing apparatus according to the invention.

FIG. 3 is a flow chart showing the procedure of processing the standard parameter setting mode in the aforesaid recording medium reproducing apparatus. First, in the case that the apparatus is in a state where a disc has not been loaded or the reproduction stand-by state, when the SETUP key 5a or the SETUP key 7a is depressed, a menu screen described later is displayed (S22). Then, it is determined whether or not the SETUP key 5a or the SETUP key 7a is depressed. When it is determined that none of these SETUP keys are depressed, the setting operation of the parameters of the dubbed audio and the subtitles is accepted in the menu screen in response to the operation of the cursor key 5d or the cursor key 7d (S26). Then, the process is returned to step S24 and the succeeding processes are repeated.

When it is determined that the SETUP key 5a or the SETUP key 7a is depressed in step S24, the parameters representing the setting of the dubbed audio and the subtitles thus accepted is registered in the standard setting area 3a (S28). Then, the menu screen is erased (S30) and the standard parameter setting mode is terminated.

Figure 4:
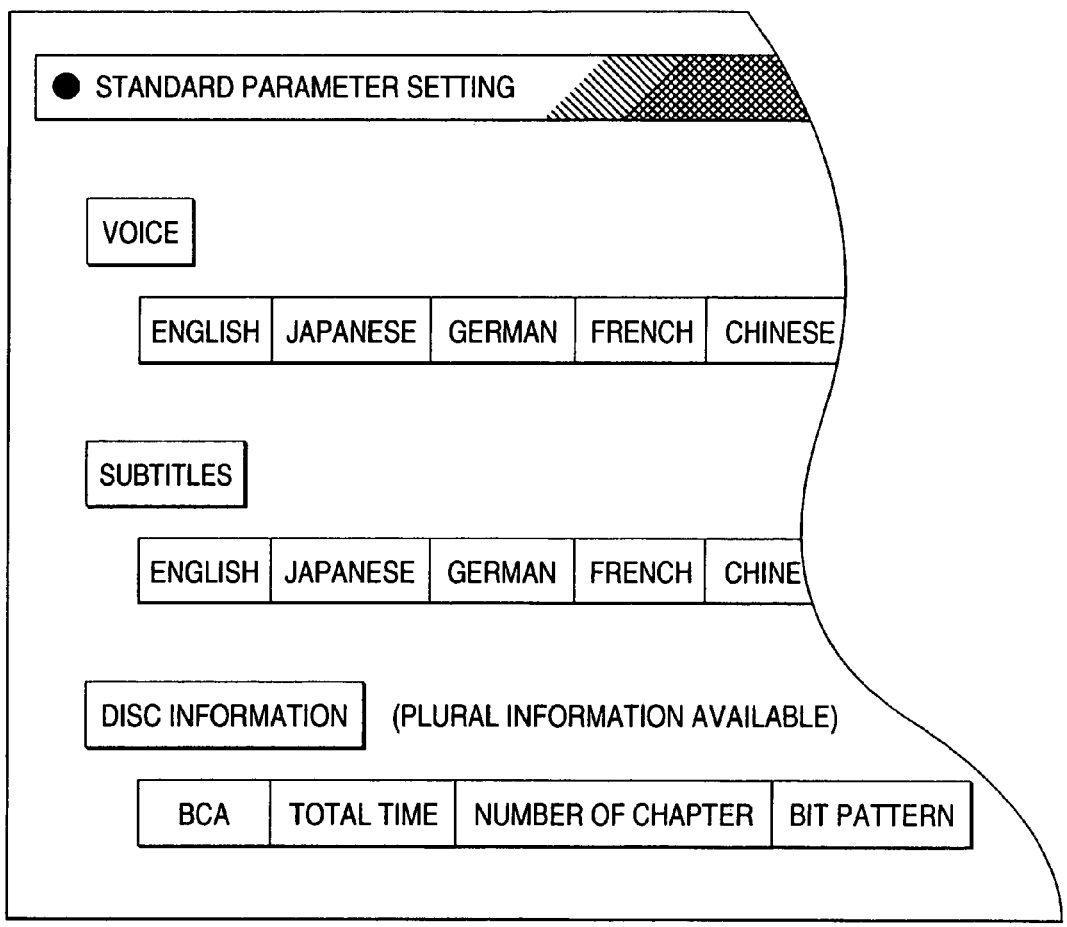
FIG. 4 is a diagram for explaining an example of the menu screen relating to the setting of the standard parameters.

FIG. 4 is a diagram for explaining an example of the menu screen relating to the setting of the standard parameters.

As shown in the figure, in the menu screen, the dubbed audio to be reproduced, the subtitles to be displayed and the disc information to be used are displayed as a list sequentially from the upper portion.

As to each of the dubbed audio and the subtitles, one of the plural languages, that is, English, Japanese, German, French, Chinese etc. can be selected by operating the cursor key 5d or the cursor key 7d. As to the disc information, that is, the information used for discriminating a disc, plural items among the BCA data, the total reproduction time, the total frame numbers, the bit pattern of the particular address of the particular frame etc. can be selected. The more the kinds of the information used for the discrimination is, the more the discriminating accuracy of a disc can be improved.

Figure 5:
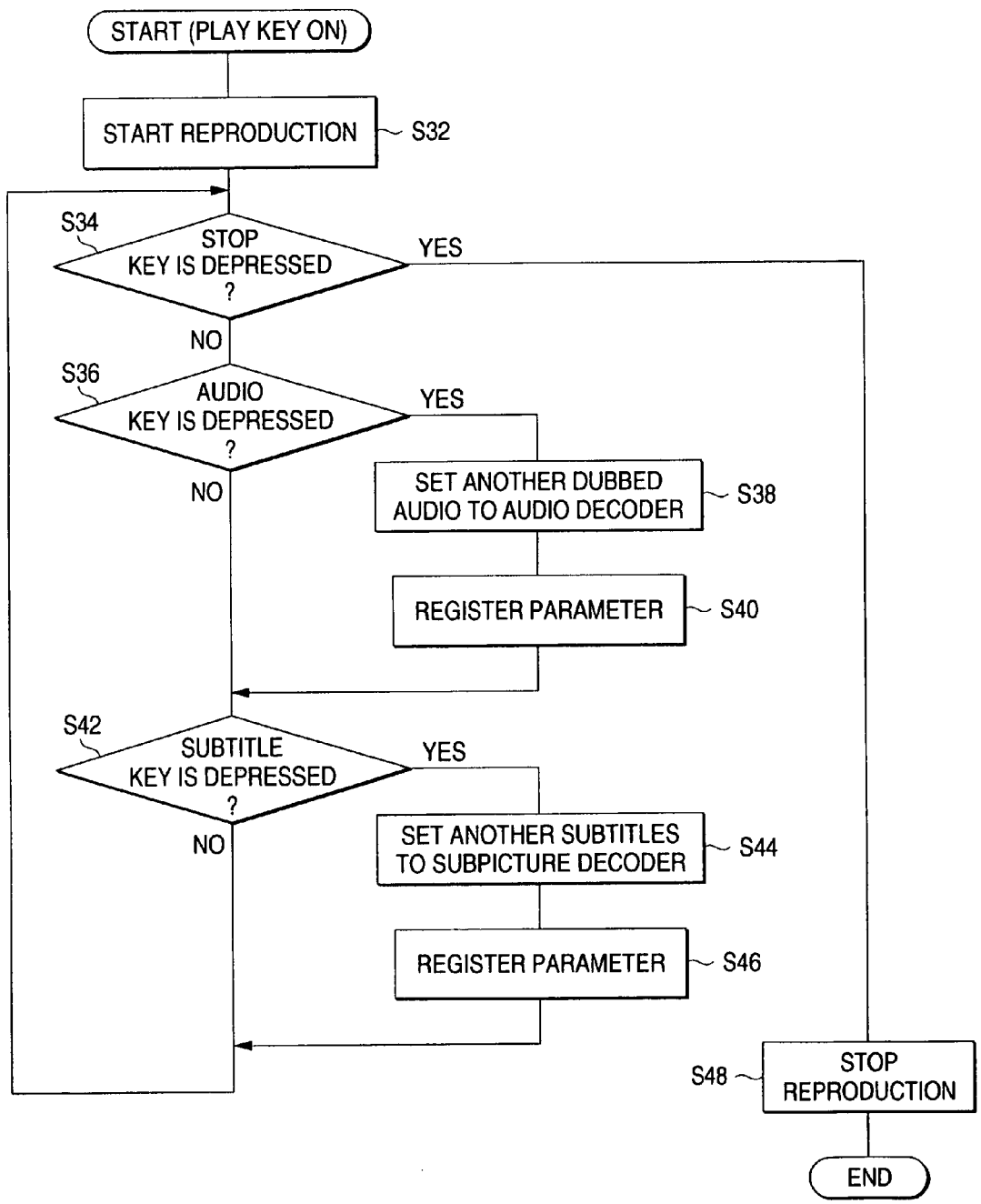
FIG. 5 is a flow chart showing the processing procedure at the time of reproducing a disc in the recording medium reproducing apparatus according to the invention.

FIG. 5 is a flow chart showing the processing procedure at the time of reproducing a disc in the aforesaid recording medium reproducing apparatus. First, in the reproduction stand-by state, the reproduction operation is started when the PLAY key 5e or the PLAY key 7e is depressed (S32). Then, it is determined whether or not the STOP key 5f or the STOP key 7f is depressed (S34). When it is determined that none of these STOP keys are depressed, it is determined whether or not the AUDIO key 5b or the AUDIO key 7b is depressed (S36).

When it is determined that the AUDIO key 5b or the AUDIO key 7b is depressed, another language of the dubbed audio is set to the audio decoder 12 (S38), and the parameter of the dubbed audio thus set is registered in the discrete setting area 3b in correspondence with the disc information read at the time of loading the disc (S40).

When it is determined in step S36 that none of the AUDIO key 5b and the AUDIO key 7b is depressed or when the process of step S40 is terminated, it is determined whether or not the SUBTITLE key 5c or the SUBTITLE key 7c is depressed (S42).

When the SUBTITLE key 5c or the SUBTITLE key 7c is depressed, another language of the subtitles is set to the subpicture decoder 13 (S44), and the parameter of the subtitles thus set is registered in the discrete setting area 3b in correspondence with the disc information read at the time of loading the disc (S46).

When it is determined in step S42 that none of the SUBTITLE key 5c and the SUBTITLE key 7c are depressed or when the process of step S46 is terminated, the process is returned to step S34 and the succeeding processes are repeated.

When it is determined in step S34 that the STOP key 5f or the STOP key 7f is depressed, the reproduction is stopped (S48). Then, the processing is terminated, that is, the apparatus is placed in the reproduction stand-by state.

As described above, according to the invention, since the contents recorded in a disc are discriminated and the parameters stored in advance in the memory in correspondence with the contents thus discriminated are set to the respective selection controller, excellent technical advantage can be obtained in the reduction of the burden of setting operation of the parameters of the dubbed audio and the subtitles.

According to the invention, since the content is discriminated on the basis of the BCA data recorded in a disc, excellent technical advantage can be obtained in the reduction of the burden for setting the parameters of the dubbed audio and the subtitles with small burden of the apparatus.

According to the invention, since the content is discriminated irrespective of a disc for the pay-per-view system or a disc for sale on the basis of the information obtained by analyzing the data recorded in the disc, excellent technical advantage can be obtained in the reduction of the burden of setting operation of the parameters of the dubbed audio and the subtitles.

According to the invention, since the content is discriminated irrespective of a disc for the pay-per-view system or a disc for sale on the basis of the analysis results of the total reproduction time and the chapter number of the data, excellent technical advantage can be obtained in the reduction of the burden of setting operation of the parameters of the dubbed audio and the subtitles.

According to the invention, since the contents are discriminated on the basis of the BCA data recorded in a disc in advance or on the basis of the analysis results of the total reproduction time and the chapter number of the data obtained by analyzing the data recorded in the disc, and the parameters stored in the memory in correspondence with the contents thus discriminated are set to the audio decoder and the subpicture decoder, excellent technical advantage can be obtained in the reduction of the burden of setting operation of the parameters of the dubbed audio and the subtitles.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A reproducing apparatus for a recording medium including a content to be reproduced and a plurality of selectable data contents which are related to
an identical reproduction time of the reproduced content, the apparatus comprising:
a memory for storing a standard parameter and a plurality of setting parameters respectively associated with predetermined kinds of data contents;
a discriminator for discriminating the data contents stored in the recording medium;
a parameter selector for selecting at least one of the setting parameters stored in the memory and associated with the discriminated data contents when the associated setting parameter is stored in the memory and for selecting the standard parameter when the associated setting parameter is not stored in the memory; and
a content selector for selecting at least one of the data contents stored in the recording medium based on the selected setting parameter or the standard parameter.

2. The reproducing apparatus as set forth in claim 1, wherein the discriminator discriminates the data contents stored in the recording medium based on discrimination information recorded on the recording medium.

3. The reproducing apparatus as set forth in claim 2, wherein the discrimination information is BCA data.

4. The reproducing apparatus as set forth in claim 1, wherein the discriminator discriminates the data contents stored in the recording medium by analyzing setting data recorded in the recording medium.

5. The reproducing apparatus as set forth in claim 4, wherein the setting data is data indicating a total reproduction time of stored data.

6. The reproducing apparatus as set forth in claim 4, wherein the setting data is data indicating a total number of chapter of stored data.

7. The reproducing apparatus as set forth in claim 1, wherein the data contents stored in the recording medium include plural kinds of dubbed audio data and subtitles data of the reproduced content; and
wherein the content selector includes an audio decoder for decoding one of the dubbed audio data and a subpicture decoder for decoding one of the subtitles data in accordance with the selected setting parameter, respectively.

8. The reproducing method as set forth in claim 1, wherein the plurality of setting parameters are associated with at least two of voice, subtitles, dubbed audio, PCM data, and MPEG video.

9. A method of reproducing a content stored in a recording medium together with a plurality of selectable data contents which are related to an identical reproduction time of the reproduced content, the method comprising the steps of:
storing a plurality of setting parameters respectively associated with predetermined data contents in a memory;
discriminating the data contents stored in the recording medium;
judging whether a setting parameter associated with the discriminated data contents is stored in the memory and selecting the standard parameter when the associated setting parameter is not stored in the memory;
selecting the associated setting parameter when it is stored in the memory;
selecting at least one of the data contents stored in the recording medium based on the selected setting parameter; and
reproducing the contents together with the selected data contents.

10. The reproducing method as set forth in claim 9, wherein the plurality of setting parameters are associated with at least two of voice, subtitles, dubbed audio, PCM data, and MPEG video.

* * * * *